(12) United States Patent
Morinaga

(10) Patent No.: US 7,446,960 B2
(45) Date of Patent: Nov. 4, 2008

(54) LENS DRIVING DEVICE

(75) Inventor: Takahiro Morinaga, Tokyo (JP)

(73) Assignee: Canon Kabushiki Kaisha (JP)

( * ) Notice: Subject to any disclaimer, the term of this patent is extended or adjusted under 35 U.S.C. 154(b) by 169 days.

(21) Appl. No.: 11/614,419

(22) Filed: Dec. 21, 2006

(65) Prior Publication Data

US 2007/0147195 A1    Jun. 28, 2007

(30) Foreign Application Priority Data

Dec. 28, 2005  (JP)  .............................. 2005-379870

(51) Int. Cl.
  *G02B 7/02* (2006.01)
(52) U.S. Cl. ........................ 359/819; 359/822; 359/823
(58) Field of Classification Search ................. 359/819, 359/821, 822, 823, 824, 825
See application file for complete search history.

(56) References Cited

FOREIGN PATENT DOCUMENTS

| JP | 06-250070 A | 9/1994 |
|---|---|---|
| JP | 10-20177 A | 1/1998 |
| JP | 2004-94172 A | 3/2004 |

*Primary Examiner*—Timothy J Thompson
(74) *Attorney, Agent, or Firm*—Rossi, Kimms & McDowell, LLP

(57) ABSTRACT

A lens driving device which can improve the positional accuracy of a moving lens while realizing a low component count and saving space. In the lens driving device provided in a lens barrel, a lens moves along the optical axis. A guide shaft is fixed to a lens barrel case and has a male thread portion formed along the optical axis. A rotor, which is driven by a motor, has a female thread portion that is to be threadably engaged with the male thread portion. A lens holder holds the lens and moves the lens along the optical axis in response to rotation of the rotor. An urging spring urges the lens holding member onto the rotary member.

8 Claims, 7 Drawing Sheets

LENS DRIVING DEVICE

BACKGROUND OF THE INVENTION

1. Field of the Invention

The present invention relates to a lens driving device which causes a moving lens in a lens barrel provided in a zoom system or a focus system to freely move forward and backward along the optical axis in an image pickup apparatus such as a video camera or a still camera.

2. Description of the Related Art

In recent years, with miniaturization of image pickup apparatuses such as video cameras and still cameras, demand for miniaturizing lens barrels has been growing. Accordingly, there has been an increasing demand for reducing the number of components disposed within lens barrels and miniaturizing such components.

Also, with miniaturization of lens barrels, photographic optical systems have decreased markedly in size. Miniaturizing image pickup apparatuses and shortening the movement distances of moving lenses have greatly contributed to the miniaturization of photographic optical systems.

If, however, the optical sensitivities of moving lenses are increased, subjects may fall out of focus to a large extent or zoom magnifications may vary in response to even slight changes in the positions of the moving lenses, which would have serious affects on captured images. Thus, improving positional accuracies of moving lenses is essential to further miniaturization of image pickup apparatuses by increasing the optical sensitivities of moving lenses.

Where conventional lens barrels are concerned, a method has been proposed in which a lens holder is supported by a thin shaft called a rod or a guide bar, and a lead screw engaged with the lens holder is rotatively driven by a motor such as a pulse motor so as to cause the lens holder to move along the optical axis.

For example, lens driving devices in which two guide bars for guiding a lens holder holding a group of moving lenses (one of the two guide bars performs the function of inhibiting rotation of the lens holder about the guide bar), a rack member mounted on the lens holder is engaged with a motor-driven lead screw to rotate the lead screw so as to cause the lens holder guided by the two guide bars to move along the optical axis have conventionally been in widespread use (see Japanese Laid-Open Patent Publication (Kokai) No. 2004-94172, for example).

There have been other conventional lens driving devices in which a lead screw having not only its original function of transferring drive power to a lens holder but also a function of guiding a lens holder along the optical axis and positioning the lens holder in a plane orthogonal to the optical axis, that is, a guide shaft functioning as a guide bar and a lead screw is used, so that only one guide bar can perform the functions of guiding and positioning although two guide bars had been needed in the past (see Japanese Laid-Open Patent Publication (Kokai) No. H10-20177, for example).

There have been proposed still other lens driving devices in which a lens holder is fixed to a guide shaft functioning as a guide bar and a guide screw, that is, a guide shaft having a guide portion and a male thread portion formed coaxially with each other, a female thread portion is formed in the bore portion of the rotor of a stepping motor, and the motor is disposed concentrically with the guide shaft (see Japanese Laid-Open Patent Publication (Kokai) No. H06-250070, for example).

The above-mentioned conventional lens driving devices, however, needs to be equipped with the two guide bars as well as the lead screw, and a member for integrally fixing the motor and the lead screw, and therefore have the problem that a large number of components are needed, which inhibits reduction in the size and weight of the devices.

In these conventional lens driving devices, the rack member that receives drive power from the lead screw is disposed on the outer side of the two guide bars as viewed in the direction of the lens diameter, and therefore, there may be cases where there is a long distance between the moving lens and the rack member. In such cases, the rack member tends to collapse along the optical axis during transfer of drive power from the lead screw to the rack member, degrading the positional accuracy of the moving lens along the optical axis. Further, the engagement of the rack member with the lead screw tends to cause so-called tooth skip due to external forces or vibrations, and it is therefore difficult to control the lens position with accuracy.

In the above-mentioned other conventional lens driving devices, since one guide shaft functions as a lead screw and a guide bar, a low component count can be realized to reduce the size and weight of the devices. In these conventional lens driving devices, however, the guide shaft itself is caused to rotate by a motor. In addition, components shaped like a guide shaft always have a warp in terms of machining accuracy. Thus, when the guide shaft is caused to rotate by the motor, a vibration of at least several μm occurs in a plane perpendicular to the axis of the guide shaft, and accordingly, the lens holder supported by the guide shaft also vibrates with each turn of the lead screw. As a consequence, image shake occurs to cause image degradation.

In general, in driving lenses of a camera or the like, a plurality of lens holders are caused to move by different amounts within a unit time in many cases. In these conventional lens driving devices, however, the guide shaft itself rotates, and hence only one lens holder can be caused to move with respect to one guide shaft. That is, in the case of causing a plurality of lens holders to move by different amounts, it is necessary to provide a guide shaft for each lens holder, which inhibits space saving.

In the still other conventional lens driving devices mentioned above, since one guide shaft functions as a lead screw and a guide bar, a low component count can be realized to reduce the size and weight of the devices. Further, in these conventional lens driving devices, since the guide shaft is not rotated integrally with the lens holder, image shake resulting from rotation of the guide shaft does not occur when the lens holder is caused to move, as distinct from the other conventional lens driving devices mentioned above.

In these conventional lens driving devices, however, since the guide shaft and the lens holder are configured as one integral unit, only one lens holder can be caused to move with respect to one guide shaft. That is, in the case of causing a plurality of lens holders to move by different amounts, it is necessary to provide a guide shaft for each lens holder, which inhibits space saving.

Also, in these conventional lens driving devices, since the guide shaft and the lens holder are configured as one integral unit, the guide shaft projects along the optical axis, i.e. forward and rearward of the lens barrel in response to movement of the lens. For this reason, in the case of causing the lens to move a relatively long distance (for example, about 10 mm) along the optical axis, it is necessary to provide a space for evading the projecting guide shaft.

In general, electrical components such as a shutter unit are mounted on a lens holder in many cases. In these conventional lens driving devices, the motor is disposed in the vicinity of the lens holder, but the motor and the lens holder are not configured as an integral unit. For this reason, in the case where a shutter unit or the like is mounted on the lens holder, the distance between the motor and the shutter unit varies during movement of the lens. To cope with this, it is necessary to provide wiring of two systems for supplying power or to bifurcate wiring for supplying power.

SUMMARY OF THE INVENTION

It is an object of the present invention to provide a lens driving device which can improve the positional accuracy of a moving lens while realizing a low component count and saving space.

To attain the above object, in an aspect of the present invention, there is provided a lens driving device which is provided in a lens barrel and in which a lens moves along an optical axis, comprising a shaft member fixed to a lens barrel case and comprising a male thread portion formed along an optical axis, a rotary member comprising a female thread portion that is to be threadably engaged with the male thread portion, a driving device that drives the rotary member, a lens holding member that holds the lens and moves the lens along the optical axis in response to rotation of the rotary member, and an urging member that urges the lens holding member onto the rotary member.

Preferably, the rotary member comprises a cylindrical member having an inner circumferential surface on which the female thread portion is formed, and the shaft member is inserted into the cylindrical member in such a manner that the male thread portion is threadably engaged with the female thread portion.

Preferably, the driving device comprises a motor, and the cylindrical member comprises a rotor.

More preferably, the motor is provided integrally with the lens holding member and comprises a motor case that defines an inner space for holding the rotor, and the motor case comprises a pair of bearing portions that cooperate with the shaft member to pivotally support the rotor in the inner space.

More preferably, at least one of the pair of bearing portions comprises a first abutting surface that abuts on the rotor, and the rotor comprises a second abutting surface that is provided perpendicularly to an axis of the rotor and abuts on the first abutting surface.

More preferably, the rotor has both ends thereof having a pair of cylindrical portions with a smaller diameter than an outer diameter of a substantially central portion of the rotor, the pair of cylindrical portions being supported by the pair of bearing portions via outer circumferential surfaces of the cylindrical portions.

More preferably, the female thread portion is formed throughout an area between both ends of the rotor.

Preferably, the male thread portion comprises a trapezoidal screw thread.

According to the present invention, the shaft member having the male thread portion is fixed to the barrel case, the rotary member having the female thread portion is threadably engaged with the male thread portion, the driving device drives the rotary member, the lens holding member holding the lens moves the lens along the optical axis in response to rotation of the rotary member, and the urging device urges the lens holding member onto the rotary member. Thus, the shaft member fixed to the barrel case functions as a lead screw and a guide shaft, and the lens holding member urged by the rotary member moves along the optical axis in response to rotation of the rotary member to prevent play which would occur along the optical axis during movement of the lens holding member. It is therefore possible to improve the positional accuracy of the moving lens while realizing a low component count and saving space.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
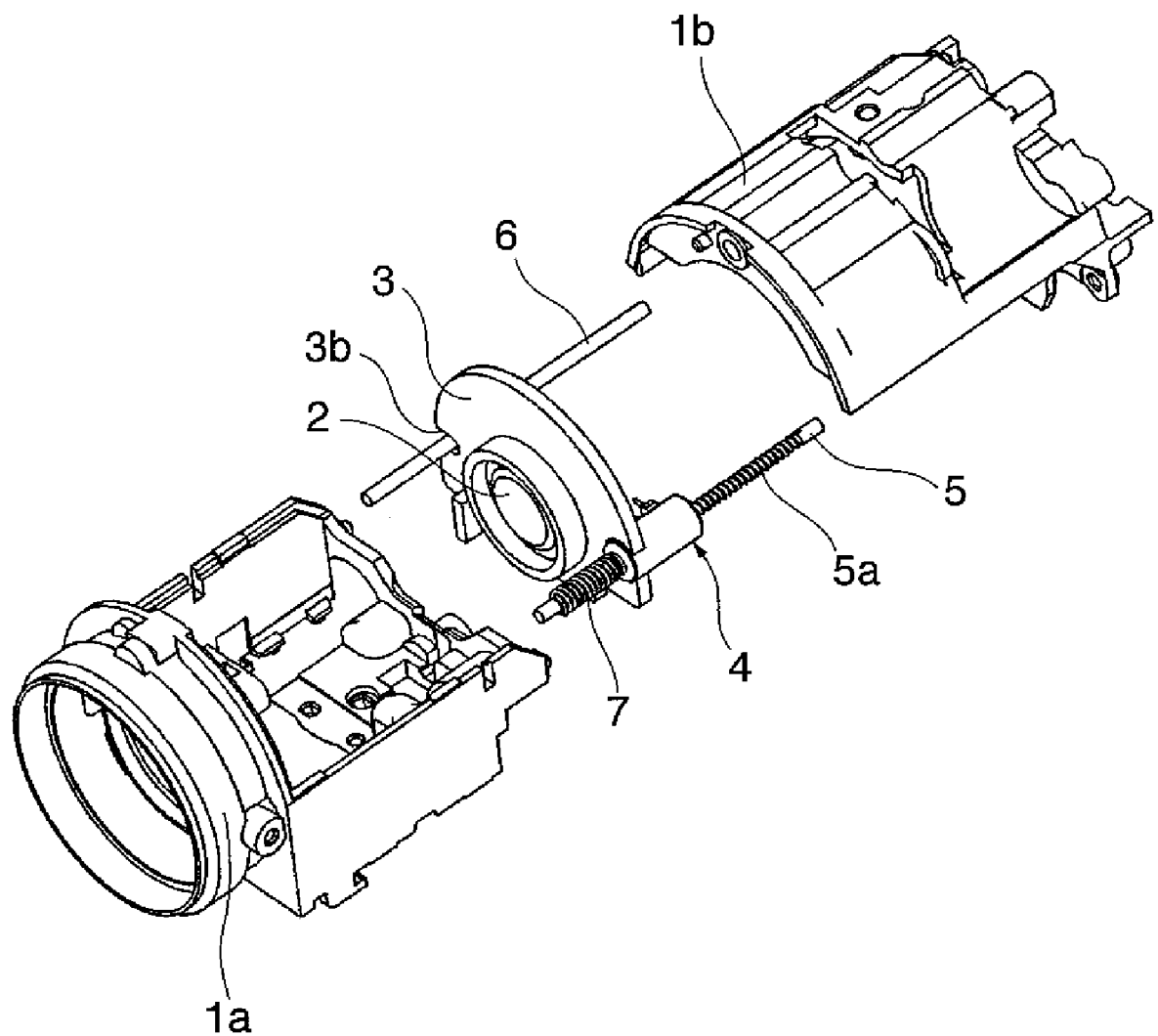
FIG. 1 is an exploded perspective view showing a lens driving device according to an embodiment of the present invention.

FIG. 1 is an exploded perspective view showing a lens driving device according to an embodiment of the present invention.

As shown in FIG. 1, the lens driving device is comprised of a front barrel case 1a; a rear barrel case 1b; a lens 2; a guide shaft 5 that is fixed to the front barrel case 1a and the rear barrel case 1b in such a manner as to be parallel with the optical axis and has a male thread portion 5a formed along the optical axis; a motor 4 that drives a rotor 12, described later, rotating about the guide shaft 4; a lens holder 3 that holds the lens 2 and moves the lens 2 along the optical axis in response to rotation of the rotor 12; a guide bar 6 fixed to the front barrel case 1a and the rear barrel case 1b in such a manner as to be parallel with the optical axis; and an urging spring 7 that urges the lens holder 3 onto the rotor 12.

The guide shaft 5 has the male thread portion 5a that is helical and formed with a predetermined pitch in the axial direction. As mentioned above, the guide shaft 5 is fixed to the front barrel case 1a and the rear barrel case 1b in such a manner as to be parallel with the optical axis, and hence the guide shaft 5 itself does not rotate. For this reason, vibrations of the lens holder 3 with each turn of the guide shaft 5 do not occur in a plane perpendicular to the optical axis, and therefore the lens 2 can be held with high accuracy, so that degradation in the qualities of captured images can be prevented. Also, when the lens holder 3 is moving, the guide shaft 5 does not project in the longitudinal direction of the lens barrel, and hence there is no need to provide space for evading the guide shaft 5, resulting in space saving.

The motor 4 is fixed to the lens holder 3, and the rotor 12 which is an output shaft is provided inside the motor 4. The rotor 12 is driven by the motor 4 in such a manner as to be rotatable forward and backward.

In the rim of the lens holder 3, a U-shaped groove 3b is formed in opposed relation to the motor 4 with respect to the lens 2. The U-shaped groove 3b is engaged with the guide bar 6. The guide bar 6 is slidable in a direction parallel to the optical axis and inhibits rotation of the lens holder 3 in a direction perpendicular to the optical axis.

The urging spring 7 has one end thereof fixed to the front barrel case 1a and the other end thereof fixed to the lens holder 3. Note that the structure of the urging spring 7 will be described later in detail.

Figure 2:
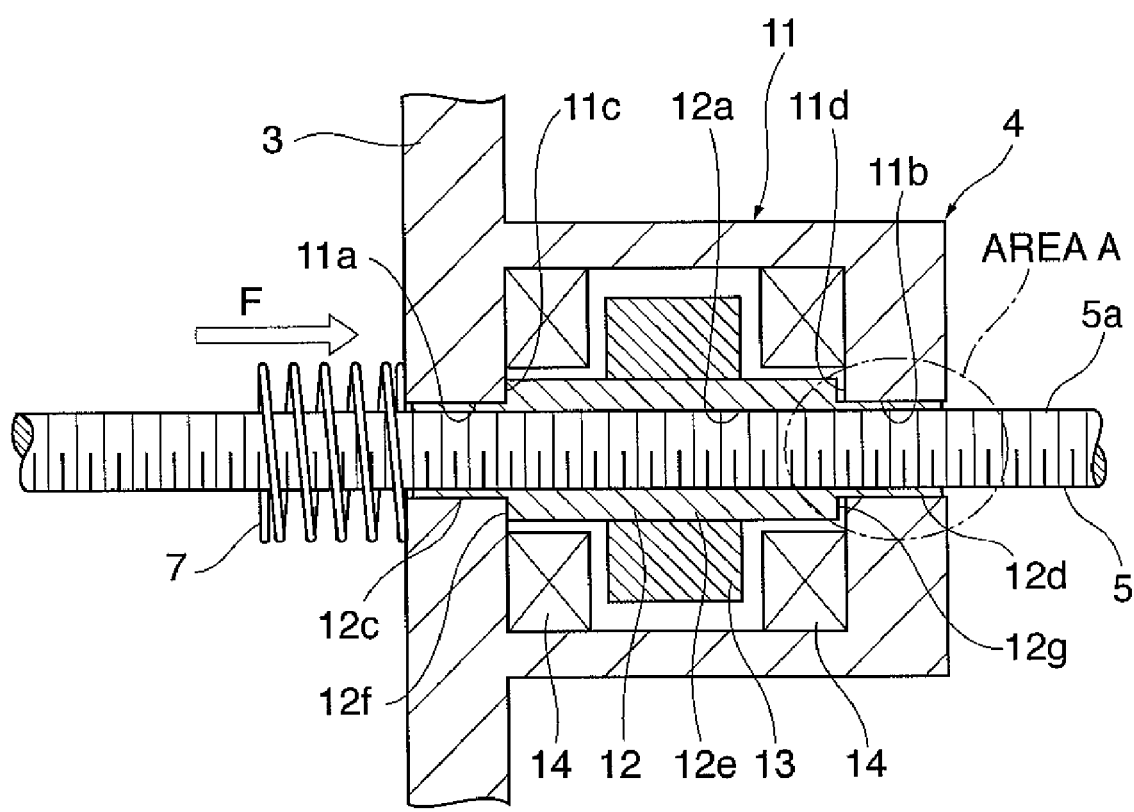
FIG. 2 is a sectional view showing a motor appearing in FIG. 1.

FIG. 2 is a sectional view showing the motor 4 appearing in FIG. 1.

As shown in FIG. 2, the motor 4 is formed integrally with the lens holder 3 and comprised of a substantially cylindrical motor case 11 that defines an inner space for holding the rotor 12, described later, the rotor (rotary member) 12 pivotally supported by a pair of bearing portions 11a and 11b, described later, in such a manner as to be rotatable forward and backward, a magnet 13 that is fixed to or formed integrally with the outer circumferential surface of the rotor 12 and magnetized in the radial direction of the rotor 12, and a coil 14 disposed in opposed relation to the magnet 13 and fixed to the motor case 11.

The motor case 11 has the pair of bearing portions 11a and 11b that cooperate with the guide shaft 5 to pivotally support the rotor 12 in the above-mentioned inner space. The bearing portions 11a and 11b have opposing surfaces 11a and 11d, respectively, which are opposed to each other as viewed in the axial direction of the guide shaft 5. The opposing surface 11c abuts on an abutting surface 12f of the rotor 12, described later.

The rotor 12 is comprised of, for example, a cylindrical member and has an inner circumferential surface thereof formed with a female thread portion 12a that is to be threadably engaged with the male thread portion 5a of the guide shaft 5. The female thread portion 12a is formed throughout the area between both ends of the rotor 12. The guide shaft 5 is inserted into the rotor 12 in such a manner that the male thread portion 5a is threadably engaged with the female thread portion 12a. Thus, satisfactory feeding accuracy along the optical axis can be realized, and the lens position can be accurately controlled since so-called tooth skip can be prevented.

The rotor 12 also has a pair of cylindrical portions 12c and 12d having a smaller diameter than the outer diameter of a central portion 12e. The cylindrical portions 12c and 12d are supported by the bearing portions 11a and 11b, respectively, via outer circumferential surfaces of the cylindrical portions 12c and 12d. Further, the rotor 12 has the central portion 12e and a pair of substantially annular abutting surfaces 12f and 12g perpendicular to the axis of the rotor 12. The abutting surface 12f (second abutting surface) abuts on the opposing surface 11c of the lens holder 3 as viewed in the axial direction.

Figure 3:
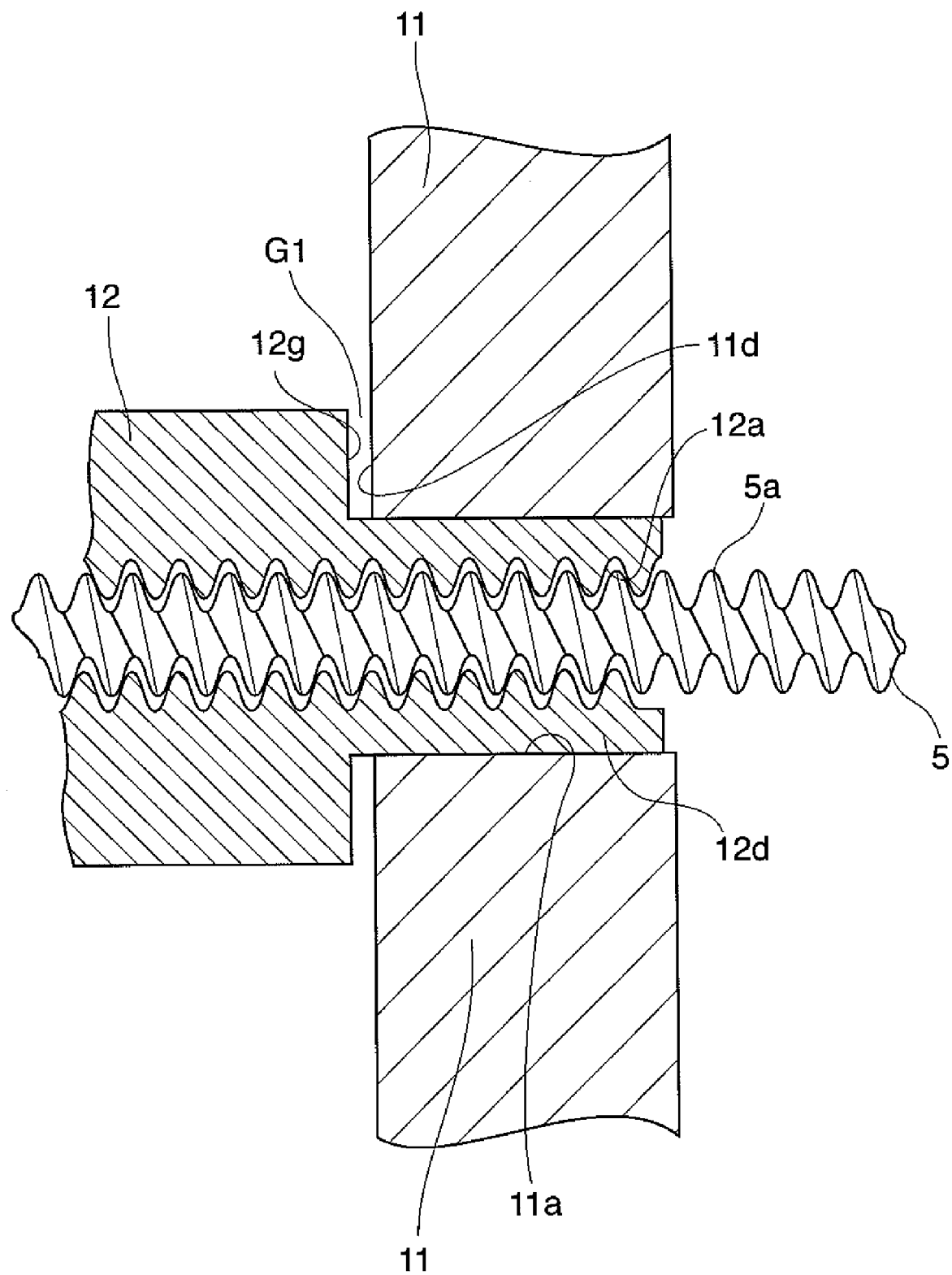
FIG. 3 is an enlarged sectional view showing an area in the vicinity of a bearing portion appearing (area A) in FIG. 2.

FIG. 3 is an enlarged sectional view showing an area in the vicinity of the bearing portion 11b (area A) in FIG. 2.

As shown in FIG. 3, as described above, the helical female thread portion 12a is formed throughout the inner peripheral surface of the rotor 12, and the helical male thread portion 5a is formed throughout the outer peripheral surface of the guide shaft 5. One side of each concave of the female thread portion 12a abuts on one side of each convex of the male thread portion 5a.

In the lens driving device constructed as described above, when the rotor 12 rotates in response to a change of magnetic pole occurring in the vicinity of the coil 14, the female thread portion 12a of the rotor 12 rotates in engagement with the male thread portion 5a of the guide shaft 5, and the rotor 12 itself moves along the axis of the guide shaft 5. Accordingly, the motor 4 pivotally supporting the rotor 12 and the lens holder 3 fixed to the motor 4 move along the axis of the guide shaft 5. Also, the lens holder 3 moves to a predetermined position along the axis of the guide shaft 5 in accordance with the amount of forward/backward rotation of the rotor 12 which is the output shaft of the motor 4.

In general, it is necessary to prevent the following two kinds of play (backlash) by urging in lens driving devices: 1) play between a lens holder and a drive member such as a nut rack; and 2) play between a lead screw, which drives a lens holder, and a drive member. In the present embodiment, the urging spring 7 urges the lens holder 3 with urging force F in a direction indicated by the arrow in FIG. 2.

Since the lens holder 3 is urged along the optical axis, i.e. onto the rotor 12 by the urging force F, no gap is formed between the opposing surface 11c of the lens holder 3 and the abutting surface 12f of the rotor 12, and the opposing surface 11c and the abutting surface 12f abut on each other. This prevents play between the lens holder 3 and the rotor 12 along the optical axis. Also, since the lens holder 3 urged along the optical axis by the urging force F urges the rotor 12 along the optical axis, i.e. onto the guide shaft 5, no gap is firmed between the female thread portion 12a and the male thread portion 5a, and the female thread portion 12a and the male thread portion 5a abut on each other. This prevents play between the rotor 12 and the guide shaft 5 in the direction of the optical axis.

A gap G is provided between the abutting surface 11d of the lens holder 3 and the abutting surface 12g of the rotor 12. This gap G1 absorbs an undulation caused by rotation of the female thread portion 12a. This prevents the male thread portion 5a and the female thread portion 12a from becoming locked during rotation thereof and makes it possible to smoothly rotate the guide shaft 5.

As described above, according to the present embodiment, the guide shaft 5 having the male thread portion 5a is fixed to the front barrel case 1a and the rear barrel case 1b in such a manner as to be parallel with the optical axis, the rotor 12 having the female thread portion 12a is threadably engaged with the male thread portion 5a, the motor 4 drives the rotor 12, the lens holder 3 holding the lens 2 moves the lens 2 along the optical axis in response to rotation of the rotor 12, and the urging spring 7 urges the lens holder 3 onto the rotor 12. Thus, the guide shaft 5 fixed to the barrel cases 1a and 1b doubles as a screw shaft, and the lens holder 3 urged onto the rotor 12 moves along the optical axis in response to rotation of the rotor 12, thereby preventing play which would occur along the optical axis when the lens holder 3 is moving. This improves the positional accuracy of the lens holder 3 with respect to the direction of the optical axis while realizing a low component count and saving space.

Also, since urging the lens holder 3 onto the rotor 12 prevents play along the optical axis which would occur during movement of the lens holder 3, the lens position can be controlled with accuracy even when tooth skip of the male thread portion 5a occurs due to external forces or vibrations.

Although in the present embodiment, the motor 4 is formed integrally with the lens holder 3, the present invention is not limited to this, but the motor 4 may be fixed to the lens holder 3.

Further, although in the present embodiment, the urging spring 7 has one end thereof abutting on the front barrel case 1a, the present invention is not limited to this, but the urging spring 7 may have one end thereof abutting on the rear barrel case 1b.

It should be noted that the constructions of the rotor 12, magnet 13, and coil 14 are not limited to those of the present embodiment, they may be identical in construction with e.g. conventional motors. Also, the motor 4 may be implemented by any type of motor such as a stepping motor or a pulse motor insofar as it is rotatable forward and backward.

Figure 4:
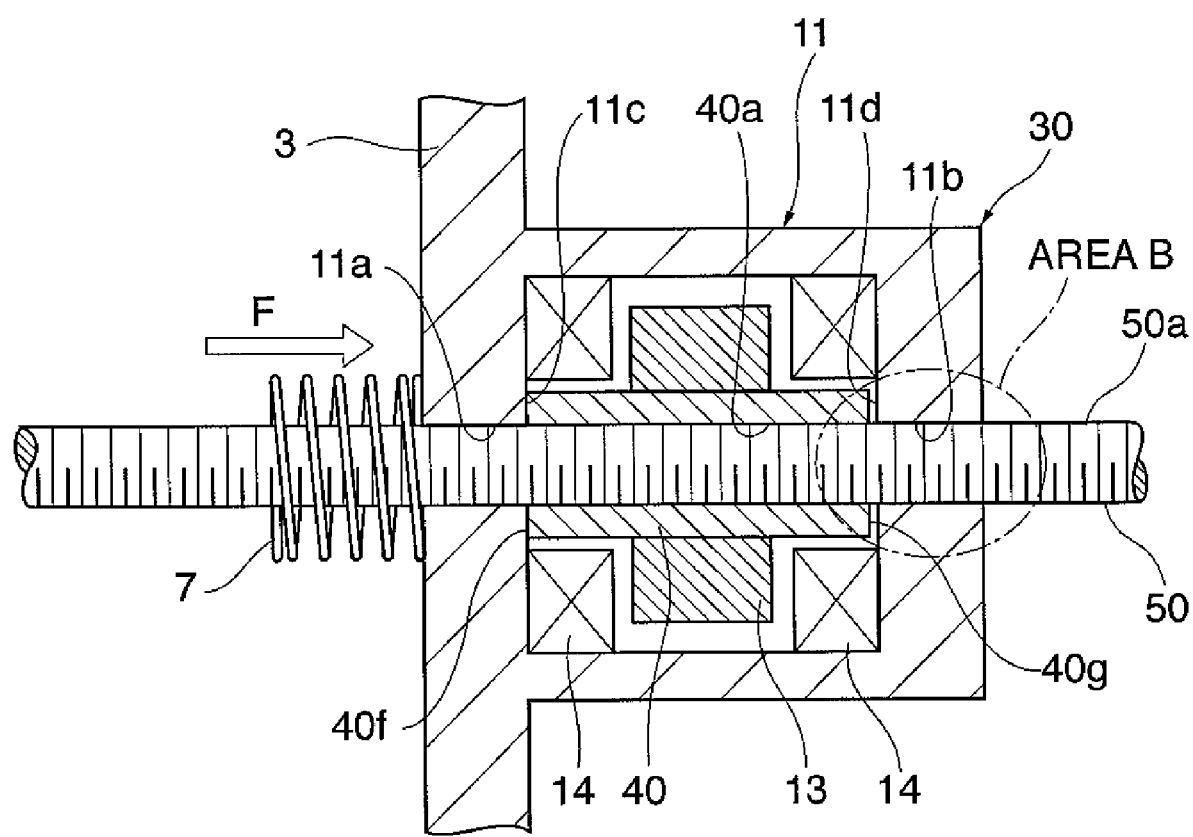
FIG. 4 is a sectional view showing a variation of the motor in FIG. 2.
Figure 5:
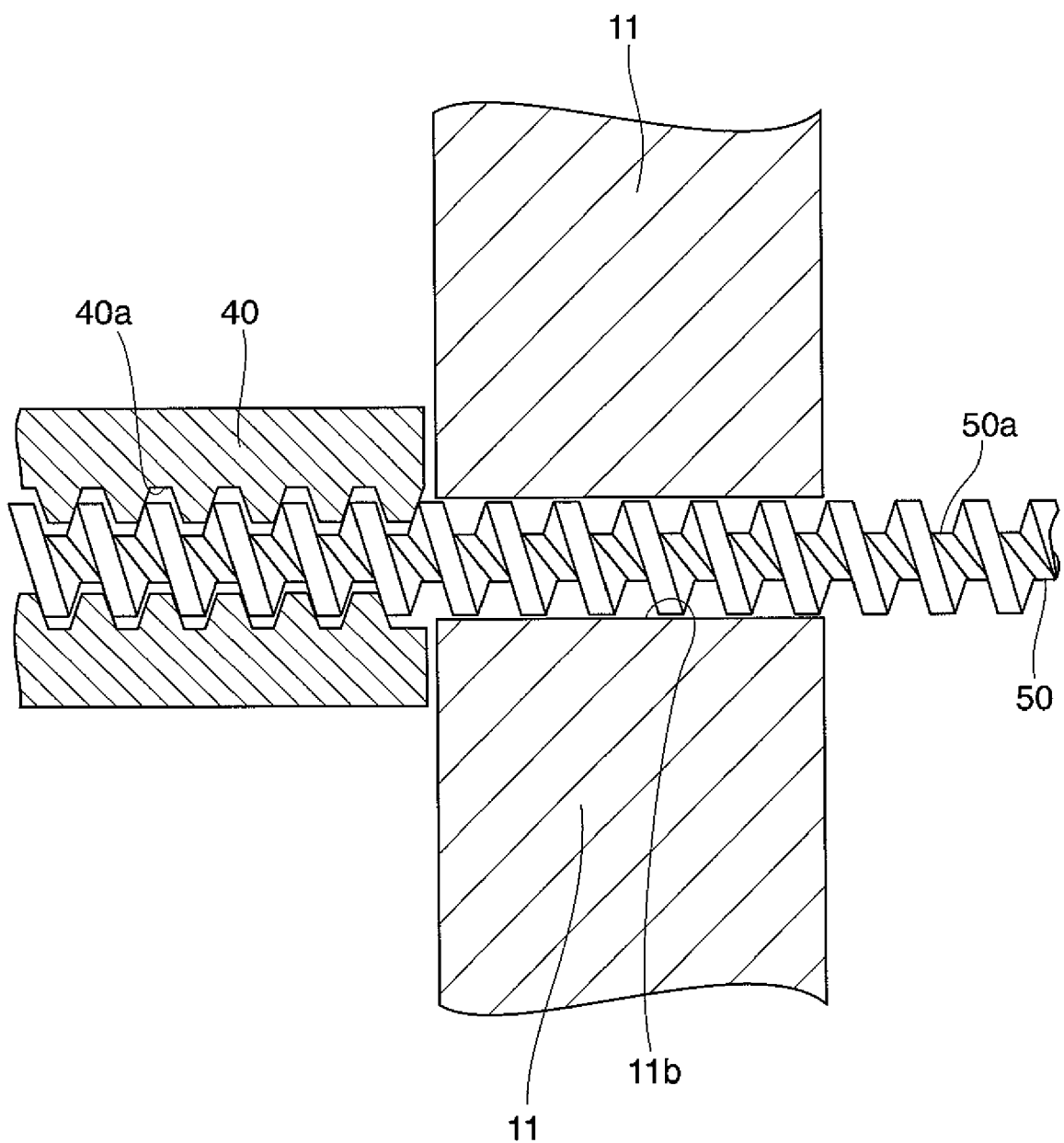
FIG. 5 is an enlarged sectional view showing an area in the vicinity of a bearing portion appearing (area B) in FIG. 4.

FIG. 4 is a sectional view showing a variation of the motor 4 appearing in FIG. 2. FIG. 5 is an enlarged sectional view showing an area in the vicinity of the bearing portion 11b (area B) in FIG. 4. This variation is basically identical in construction with the first embodiment described above, and component elements corresponding to those of the first embodiment are denoted by the same reference numerals and duplicate description thereof is omitted. Only points of differences between this variation and the first embodiment will be described below.

As shown in FIGS. 4 and 5, a motor 30 is equipped with a rotor 40 held in the motor case 11. The rotor 40 is comprised of, for example, a cylindrical member and has an inner circumferential surface thereof formed with a female thread portion 40a that is to be threadably engaged with a male thread portion 50a of a guide shaft 50. The female thread portion 40a is formed throughout the area between both ends of the rotor 40. The guide shaft 50 is inserted into the rotor 40 in such a manner that the male thread portion 50a is threadably engaged with the female thread portion 40a. Thus, satisfactory feeding accuracy along the optical axis can be realized, and the lens position can be accurately controlled since so-called tooth skip can be prevented.

Also, the rotor 40 has a pair of substantially annular abutting surfaces 40f and 40g perpendicular to the axis of the rotor 40. The abutting surface 40f abuts on the opposing surface 11c of the lens holder 3 as viewed in the axial direction.

The guide shaft 50 is pivotally supported by the pair of bearing portions 11a and 11b. Specifically, in the present variation, the guide shaft 50 is pivotally supported directly by the bearing portions 11a and 11b with the rotor 40 being not interposed between the guide shaft 50 and the pair of bearing portions 11a and 11b. The male thread portion 50a is implemented by, for example, a trapezoidal screw thread, and the male thread portion 50a which is helical is formed throughout the outer circumferential surface of the guide shaft 50. One side of each concave of the female thread portion 40a abuts on one side of each convex of the male thread portion 50a.

In the lens driving device according to the present variation, when the rotor 40 rotates in response to a change of magnetic pole occurring in the vicinity of the coil 14, the female thread portion 40a of the rotor 40 rotates in engagement with the male thread portion 50a of the guide shaft 50, and the rotor 40 itself moves along the axis of the guide shaft 50. Accordingly, the motor 30 pivotally supporting the rotor 40 and the lens holder 3 fixed to the motor 30 move along the axis of the guide shaft 50. Also, the urging force F of the urging spring 7 moves the lens holder 3 to a predetermined position along the axis of the guide shaft 50 in accordance with the amount of forward/backward rotation of the rotor 40.

According to the present variation, since the guide shaft 50 is pivotally supported directly by the pair of bearing portions 11a and 11b of the lens holder 3, the lens holder 3 can hold the lens 2 on a plane perpendicular to the optical axis without collapsing along the optical axis, and therefore the positional accuracy of the lens holder 3 can be further improved. Also, the lens holder 3 can be slid more smoothly on the guide shaft 50.

Although in the present variation, the male thread portion 50a is formed throughout the outer circumferential surface of the guide shaft 50, the male thread portions 50a may be formed at fixed intervals in the longitudinal direction of the guide shaft 50 so that only part of the male thread portions 50a is engaged with the female thread portion 40a of the rotor 40. In this case, the area pivotally supported directly by the bearing portions 11a and 11b of the lens holder 3 can be increased, and as a result, the positional accuracy of the lens holder 3 can be further improved.

Figure 6:
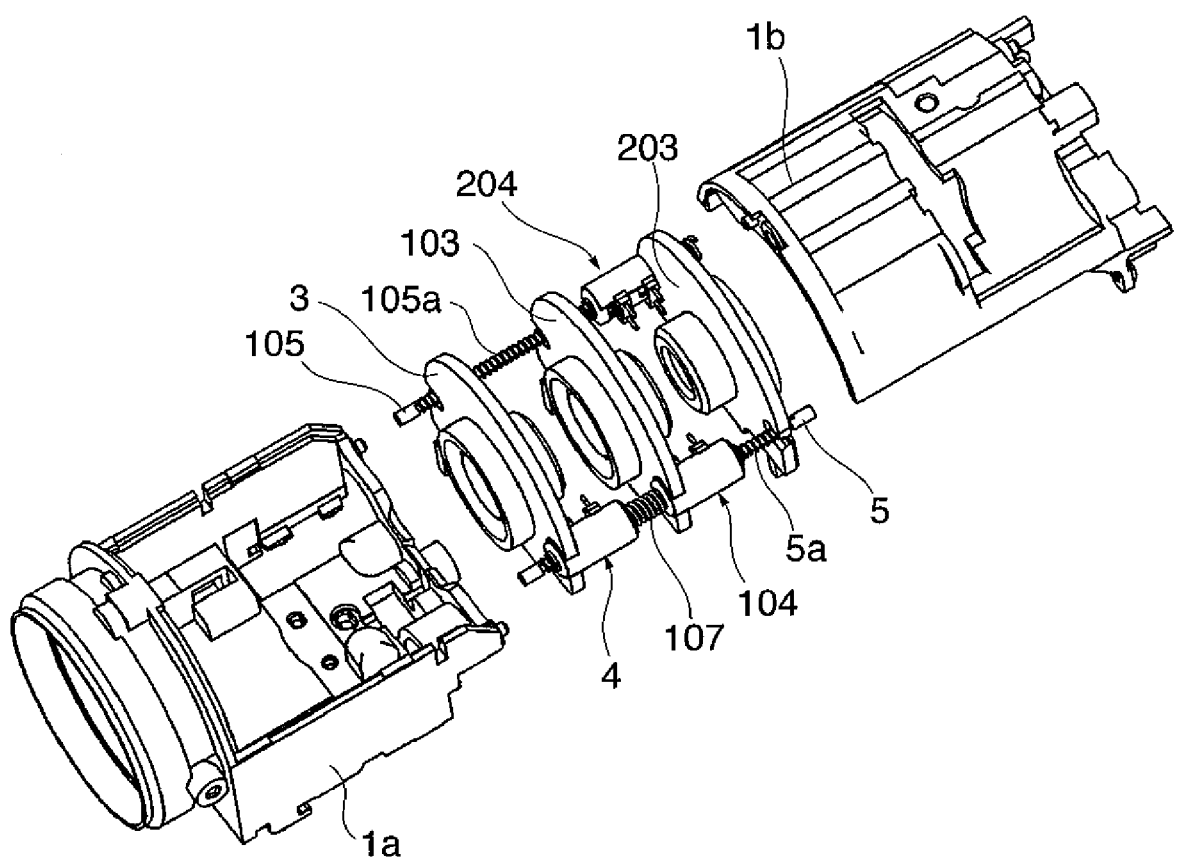
FIG. 6 is an exploded perspective view showing a variation of the lens driving device in FIG. 1.

FIG. 6 is an exploded perspective view showing a variation of the lens driving device in FIG. 1. It should be noted that in this variation, the motor 4 and a lens holder are configured as one integral unit, and two such units are disposed along the guide shaft 5. This variation is basically identical in construction with the first embodiment described above, and therefore the same component elements corresponding to those of the first embodiment are denoted by the same reference numerals and duplicate description thereof is omitted. Only points of differences between this variation and the first embodiment will be described below.

As shown in FIG. 6, the lens driving device is comprised of the lens holder 3 provided integrally with the motor 4; a lens holder 103 provided integrally with a motor 104; a lens holder 203 provided integrally with a motor 204 and disposed in a staggered configuration with respect to the lens holder 103; a guide shaft 105 fixed to the front barrel case 1a and the rear barrel case 1b in such a manner as to be parallel with the optical shaft and has a male thread portion 105a; and an urging spring 107 that is sandwiched between the motor 4 and the motor 104, has both ends thereof abutting on the motor 4 and the motor 104, respectively, and urges the motor 4 and the motor 104 at the same time.

According to the present variation, since the lens holder 103 and the lens holder 203 are disposed on the guide shaft 5, space can be saved even in the case where a plurality of lens holders are caused to move by different amounts. Also, according to the present variation, since the guide shaft 105 is provided in addition to the guide shaft 5, and the lens holder 103 and the lens holder 203 are disposed in two rows in a staggered configuration, the motor 204 having a predetermined length along the optical axis can be disposed on a different guide shaft from the guide shaft on which the motor 104 is disposed. Thus, the lens holder 103 and the lens holder 203 can be disposed in the vicinity of each other, and space can be further saved.

It should be noted that although in the present variation, the lens driving device is equipped with the guide shaft 105 and the lens holder 203 disposed in a staggered configuration with respect to the lens holder 103, the present invention is not limited to this, the lens driving device should not necessarily be equipped with the guide shaft 105 and the lens holder 203. In this case, the lens driving device is equipped with the guide bar 6 in place of the guide shaft 105. Thus, only one guide shaft may suffice even in the case where a plurality of lens holders are caused to move by different amounts, and space can be saved.

Figure 7:
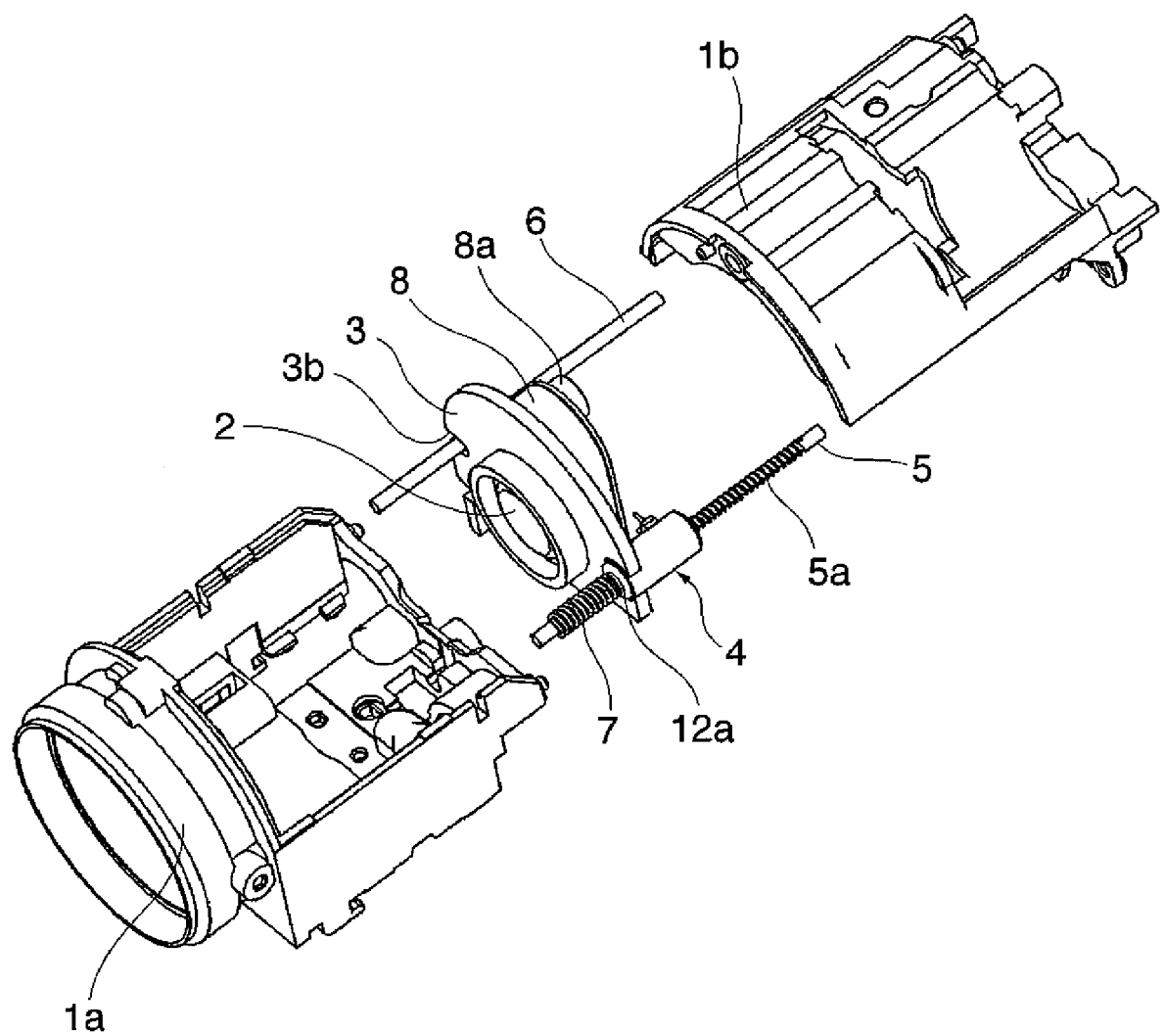
FIG. 7 is an exploded perspective view showing a variation of the lens driving device in FIG. 1.

FIG. 7 is an exploded perspective view showing a variation of the lens driving device in FIG. 1. This variation is basically identical in construction with the first embodiment described above, and therefore the same component elements corresponding to those of the first embodiment are denoted by the same reference numerals and duplicate description thereof is omitted. Only points of differences between this variation and the first embodiment will be described below.

As shown in FIG. 7, the lens driving device is comprised of a shatter unit 8 integrally mounted on the lens holder 3, and an actuator 8a mounted on the shatter unit 8, for actuating a shatter blade of the shatter unit 8.

In the present variation, since the motor 4 is provided integrally with the lens holder 3, and the shatter unit 8 is mounted integrally on the lens holder 3, only one flexible hose has to be provided for use as an electric wire which supplies power to the motor 4 and the actuator 8a. Thus, space can be saved, and components can be miniaturized.

Although in the present variation, the shatter unit 8 is mounted integrally on the lens holder 3, the present invention is not limited to this, but it goes without saying that electrical components constituting a detection system or a vibration isolation system may be mounted integrally on the lens holder 3.

This application claims the benefit of Japanese Application No. 2005-379870 filed Dec. 28, 2005, which is hereby incorporated by reference herein in its entirety.

What is claimed is:

1. A lens driving device which is provided in a lens barrel and in which a lens moves along an optical axis, comprising:
   a shaft member fixed to a lens barrel case and comprising a male thread portion formed along an optical axis;
   a rotary member comprising a female thread portion that is to be threadably engaged with said male thread portion;
   a driving device that drives said rotary member;
   a lens holding member that holds the lens and moves the lens along the optical axis in response to rotation of said rotary member; and
   an urging member that urges said lens holding member onto said rotary member.

2. A lens driving device according to claim 1, wherein said rotary member comprises a cylindrical member having an inner circumferential surface on which said female thread portion is formed, and said shaft member is inserted into said cylindrical member in such a manner that said male thread portion is threadably engaged with said female thread portion.

3. A lens driving device according to claim 1, wherein said driving device comprises a motor, and said cylindrical member comprises a rotor.

4. A lens driving device according to claim 3, wherein said motor is provided integrally with said lens holding member and comprises a motor case that defines an inner space for holding said rotor, and said motor case comprises a pair of bearing portions that cooperate with said shaft member to pivotally support said rotor in the inner space.

5. A lens driving device according to claim 4, wherein at least one of said pair of bearing portions comprises a first abutting surface that abuts on said rotor, and said rotor comprises a second abutting surface that is provided perpendicularly to an axis of said rotor and abuts on said first abutting surface.

6. A lens driving device according to claim 4, said rotor has both ends thereof having a pair of cylindrical portions with a smaller diameter than an outer diameter of a substantially central portion of said rotor, the pair of cylindrical portions being supported by said pair of bearing portions via outer circumferential surfaces of the cylindrical portions.

7. A lens driving device according to claim 3, said female thread portion is formed throughout an area between both ends of said rotor.

8. A lens driving device according to claim 1, said male thread portion comprises a trapezoidal screw thread.

* * * * *